United States Patent [19]

Bramley

[11] Patent Number: 5,276,516
[45] Date of Patent: Jan. 4, 1994

[54] GHOST CANCELING APPARATUS UTILIZING FORWARD AND REVERSE FOURIER TRANSFORM PROCESSING

[75] Inventor: Richard G. Bramley, Bristol, United Kingdom

[73] Assignee: Inmos Limited, Bristol, England

[21] Appl. No.: 897,353

[22] Filed: Jun. 11, 1992

[30] Foreign Application Priority Data

Jun. 11, 1991 [GB] United Kingdom ............... 9112570

[51] Int. Cl.[5] ............................................. H04N 5/21
[52] U.S. Cl. ................................... 358/167; 358/905
[58] Field of Search .................... 358/167, 36, 905; H04N 5/21

[56] References Cited

U.S. PATENT DOCUMENTS

| | | | |
|---|---|---|---|
| 4,313,195 | 1/1982 | Lehmann | 370/84 |
| 4,897,725 | 1/1990 | Tanaka et al. | 358/167 |
| 5,065,242 | 11/1991 | Dietrich et al. | 358/167 |
| 5,119,196 | 6/1992 | Ayanoglu et al. | 358/905 X |

Primary Examiner—Mark R. Powell
Attorney, Agent, or Firm—Edward Manzo

[57] ABSTRACT

A method and apparatus are disclosed for filtering ghost signals from a video signal sequence. Storage circuitry stores a representation of a reference signal, Input circuitry inputs video signals from the video signal sequence. Comparison circuitry compares the stored representation of the reference signal with a reference signal received in the video signal sequence at the input circuitry, thereby to detect ghosts. Filter coefficient generating circuitry is connected to the comparison circuitry to generate a frequency domain representation of filter coefficients dependent on ghost signals detected. A forward Fourier transform pipeline is connected to the input circuitry to form a frequency domain representation of data in the video signal sequence received by the input circuitry. Product forming circuitry forms in the frequency domain a product of the filter coefficients with the frequency domain representation of the data in the video signal sequence. An inverse Fourier transform pipeline is connected to the product forming circuitry for receiving the product and transforming it to provide an output in the time domain representing the video signal sequence from which detected ghost signals have been removed.

21 Claims, 4 Drawing Sheets

GHOST CANCELING APPARATUS UTILIZING FORWARD AND REVERSE FOURIER TRANSFORM PROCESSING

The invention relates to video signal processing and particularly to removal of ghost signals in a video signal sequence.

BACKGROUND OF THE INVENTION

It is well known that ghosts or echoes are produced in a video signal sequence when the signal is subject to multiple reflections and multi-path propagation. Depending on the path differences between different signals arriving at a receiver, time delays between a main signal and ghosts of the signal can vary between $-5$ $\mu$s and $+45$ $\mu$s. It is known to remove ghost signals in such a video sequence by filtering using an adaptive filter to inverse filter the signal. Such filters operating in the time domain need a very long transversal filter with programmable coefficients. In this way a digital sample of the video signal is multiplied simultaneously by each of the filter coefficients. To remove a ghost signal at a time delay T after the main signal it is necessary for the data sample to have a length T/d where d is the digital sample frequency of the data. In the case of video signals the frequency is such that the length of data sample T/d is sufficiently great that a very long filter is required to handle the multiplication of all the digital values in the sample simultaneously. A suitable filter in the time domain may require something of the order of 600 taps each tap effecting one multiplication. Due to the limitations of hardware techniques in the filters such long filters have been produced by cascading shorter filters with consequent increase in expense. An alternative technique has been to use shorter filters and programmable delay lines. This however limits the number of ghosts that can be cancelled at any one time.

SUMMARY OF THE INVENTION

It is an object of the present invention to provide an improved method of, and apparatus for, removal of ghost signals from a video sequence using filters operating in the frequency domain.

By operating in the frequency domain it is possible to construct a filter which achieves filtering similar to that of time domain filters but requiring calculation of a much reduced number of multications. In a preferred embodiment it is possible to construct a filter on a single semiconducting chip which carries out a filtering operation similar to a 600 tap filter in the time domain.

The present invention provides a method of filtering ghost signals from a video signal sequence which includes a ghost cancellation reference signal, which method comprises storing a representation of said reference signal, receiving said video signal at an input, effecting a comparison of said reference signal in the video signal sequence received at said input with said stored representation to detect ghost signals and forming, in a frequency domain, filter coefficients dependent on ghost signals detected by said comparison, forming a fourier transform of said video signal received at the input to transform the signal from the time domain to the frequency domain and effecting multiplication in the frequency domain of the transform of the video signal with said filter coefficients to form a product, and effecting an inverse fourier transform of said product so as to provide an output in the time domain of the video signal from which detected ghost signals have been removed.

Preferably the said video signal sequence is divided into a succession of data windows each including a selected number of data samples and fourier transforms are formed on data in each of a succession of data windows, a respective said product being formed for each data window and the filter coefficients, and said inverse fourier transform is effected for each successive product to provide a succession of outputs which are serially joined to form an output sequence of video signals corresponding to a plurality of said data windows.

Each product may be formed by multiplying together data in one window as a first multiplicand with a second multiplicand including the said filter coefficients, both multiplicands having a vector length equal to the number of data samples in said one window.

Convolutions effected by use of fourier transforms are cyclic and to provide a linear result it is preferred that said product is formed from first and second multiplicands where successive first multiplicands each comprise data derived from respective overlapping data windows in the video signal sequence and said second multiplicands each comprise filter 30 efficients to which zero values have been added providing an equal vector length for each multiplicand.

Each data window may have a substantially 50% overlap with data in an adjacent window.

To correspond with a 50% overlap it is preferred that each second multiplicand comprises 50% filter coefficients and 50% zero values.

Preferably the forward fourier transform of said video signal is formed in a forward pipeline comprising a plurality of radix-n butterflies connected in series, selected transform coefficients being supplied to each of said butterflies.

Preferably the inverse fourier transform of each product is formed by a backward fourier transform pipeline comprising a plurality of radix-n butterflies connected in series, selected transform coefficients being supplied to each of said butterflies.

In one embodiment the said product is formed by multiplying an output from the forward fourier transform pipeline with a signal representing the filter coefficients.

In an alternative, the said product is formed by supplying to the radix-n butterflies in the forward fast fourier transform pipeline coefficient values representing the filter coefficients as well as transform coefficients.

In one arrangement the comparison of the reference signal in the video signal sequence with the stored reference signal is effected by correlation in the time domain to calculate coefficients which are transformed to the frequency domain to form filter coefficients for use in forming said product.

In an alternative, said stored reference signal is stored in the frequency domain and the comparison of the reference signal in the video signal sequence with the stored reference signal is effected by forming a fast fourier transform of the reference signal in the video signal sequence received at the input to provide a representation of the reference signal in the frequency domain, comparing said representation with the stored reference signal and thereby providing an indication of the filter coefficients in the frequency domain.

Preferably said products are each formed by multiplying together successive pairs of first and second multiplicands in the frequency domain, the first multiplicand of each pair including data from a data window in said video signal sequence and the second multiplicand of each pair including data representing said filter coefficients, data in one of said multiplicands in one pair partially overlapping the same data in a subsequent pair of multiplicands and the other of said multiplicands in said one pair includes a plurality of zero values in addition to data, the plurality of zero values corresponding to the said overlapping of data to permit joining of successive products to provide a continuous output signal corresponding to said video signal sequence.

Preferably the said first and second multiplicands are both of the same vector length.

Preferably the said first multiplicand of each pair has overlapping data from a data window and the second multiplicand of each pair has zero values added to the filter coefficients.

Preferably the video signal sequence is divided into frames each comprising a plurality of lines and in which the comparison of the reference signal in the video signal sequence with the stored reference signal is repeated after a selected number of frames so as to provide new filter coefficients to take account of any changes in ghost signal occurrence.

The invention also provides apparatus for filtering ghost signals from a video signal sequence which includes a ghost cancellation reference signal which apparatus comprises storage circuitry for storing a representation of the reference signal, input circuitry for inputting video signals from the video signal sequence, comparison circuitry for comparing the stored representation of the reference signal with the reference signal received in the video signal sequence at said input circuitry thereby to detect ghosts, filter coefficient generating circuitry connected to said comparison circuitry to generate a frequency domain representation of filter coefficients dependent on ghost signals detected, a forward fast fourier transform pipeline connected to said input circuitry to form a frequency domain representation of data in the video signal sequence received by said input circuitry, product forming circuitry for forming in the frequency domain a product of the filter coefficients with the frequency domain representation of the data in the video signal sequence, and an inverse fast fourier transform pipeline connected to said product forming circuitry for receiving said product and transforming it to provide an output in the time domain representing said video signal sequence from which detected ghost signals have been removed.

In one embodiment the product forming circuitry comprises a multiplier connected between an output of the forward fast fourier transform pipeline and an input of the inverse fast fourier transform pipeline. Preferably each fast fourier transform pipeline comprises a series of radix-n butterflies connected in series with transform coefficient stores connected to each butterfly.

In an alternative arrangement each fast fourier transform pipeline comprises a series of radix-n butterflies connected in series with transform coefficients stores connected to each butterfly and the product forming circuitry is connected to the forward fast fourier transform pipeline to supply to said radix-n butterflies coefficient values representing the filter coefficients in addition to the transform coefficients.

The invention also includes apparatus as aforesaid for filtering ghost signals from a video signal sequence, which apparatus is formed on a single semiconductor chip.

DESCRIPTION OF THE PREFERRED EMBODIMENTS

Known adaptive filters for digital signal filtering use correlation and convolution processes. Mathematically the correlation function between two waveforms X(t) and Y(t) is expressed as $$R_{xy}(\tau) = \lim_{T \to \infty} \frac{1}{T} \int_{-\frac{\tau}{2}}^{+\frac{\tau}{2}} x(t)y(t + \tau)dt$$

The convolution function is closely related to that of correlation and for the two signals X(t) and Y(t) the convolution function is mathematically defined by $$C_{xy}(\tau) = \lim_{T \to \infty} \frac{1}{T} \int_{-\frac{\tau}{2}}^{+\frac{\tau}{2}} x(t)y(\tau - t)dt$$

Both functions are used in adaptive filters operating in the time domain. They are particularly useful in recovering desired signals masked by noise or other interference and can be used to recognize a given pattern within a signal. They do however require multiply and accumulator devices so as to carry out a large number of multiplications and additions in parallel. This provides problems in single chip implementation where multi-tap filters with large numbers of tags are required.

When operating in the time domain such filters can receive a continuous succession of video signals and carry out a linear convolution in order to remove ghost signals.

The embodiments which will now be described provide filters operating in the frequency domain rather than the time domain. They involve the formation of fourier transforms using the property that convolution in the time domain is equivalent to multiplication in the frequency domain. The Discrete Fourier Transform (DFT) of a digital sample of a video signal sequence can be computed using the Fast Fourier Transform (FFT) algorithm. A forward Fast Fourier Transform pipeline can be used to form a transform into the frequency domain of an input signal received in the time domain. Similarly a backward Fast Fourier Transform pipeline can be used to effect an inverse transform on a frequency domain signal so as to output a time domain signal. The construction and operation of such forward and backward Fast Fourier Transform pipelines is known and is described for example on pages 602 to 609 "Special Purpose Hardware for the FFT" in the book entitled Theory and Application of Digital Signall Processing by Rabiner and Gold published by Prentice Hall. The structure of such pipelines will not be described further and the disclosure in the above mentioned reference is hereby incorporated by cross reference.

The cyclic convolution property of a fourier transform can be seen from the following:

If $x_p$ and $h_p$ are two periodic sequences of period N with DFTs $$X_p(k) = \sum_{n=0}^{N-1} x_p(n)\exp(-j(2\pi/N)nk)$$

$$H_p(k) = \sum_{n=0}^{N-1} h_p(n)\exp(-j(2\pi/N)nk)$$

The circular convolution of two sequences which is a basic operation in all linear filtering applications, $$y_p(n) = \sum_{l=0}^{N-1} x_p(l) h_p(n - l)$$

taking the N-point DFT of the equation above $$Y_p(k) = \sum_{n=0}^{N-1} \left[ \sum_{l=0}^{N-1} x_p(l) \cdot h_p(n - l) \right] \exp(-j(2\pi/N)nk)$$

rearranging the order of the summation gives, $$Y_p(k) = \sum_{n=0}^{N-1} x_p(l) \left[ \sum_{l=0}^{N-1} h_p(n - l)\exp(-j(2\pi/N)(n - l)k) \right] \exp(-j(2\pi/N)lk)$$

The expression enclosed in the square brackets ([]) is the Fourier Transform of the signal $h_p$ hence with substitution, $$Y_p(k) = H_p(k) \sum_{n=0}^{N-1} x_p(l)\exp(-j(2\pi/N)lk)$$

by substitution with eqn 1 gives, $$Y_p(k) = H_p(K) \cdot X_p(K)$$

Hence it has been shown, in a formal manner, that the circular convolution of two sequences can be achieved by multiplication of their representations in the frequency domain.

Ghost cancellation requires linear convolution of a filter response to be carried out on an indefinite sequence of input data from which the ghosts are to be removed. It is not possible to transform the whole of the video signal sequence into the frequency domain at any one time and consequently the video signal sequence must be divided into a number of data windows in the time domain each containing a selected number of digital samples of the video signal. The Discrete Fourier Transform (DFT) is a linear transform and can therefore be carried out on the data windows or time domain blocks of data and then joined together in abutting relationship to produce a final convolved output sequence.

As set out above, the convolution effected by use of Fourier transforms is a periodic convolution and not a linear convolution. For the two periodic sequences $x_p$ and $h_p$ discussed above, consider $x_p(t)$ and $h_p(n-t)$ in the interval $0<t<N-1$. As N varies, $h_p(n-t)$ slides along $x_p(t)$. As the sample of $h_p(n-t)$ slides past $t=N-1$ the identical sample appears at $t=0$. This circular nature of the convolution is overcome in the following examples by using data samples of the video signal in the time domain in the form of overlapping blocks or windows and using zeros to pad out the filter coefficients used in each convolution. This technique is a known technique called zero padding. In the examples described below the data blocks are overlapped by a ratio of 2:1 and the filter coefficients are zero padded in the ratio of 2:1 so that the same number of zeros are added in each convolution as the number of filter coefficients used and 50% of the data samples in each data window used are repeated in an adjacent data window.

Figure 1:
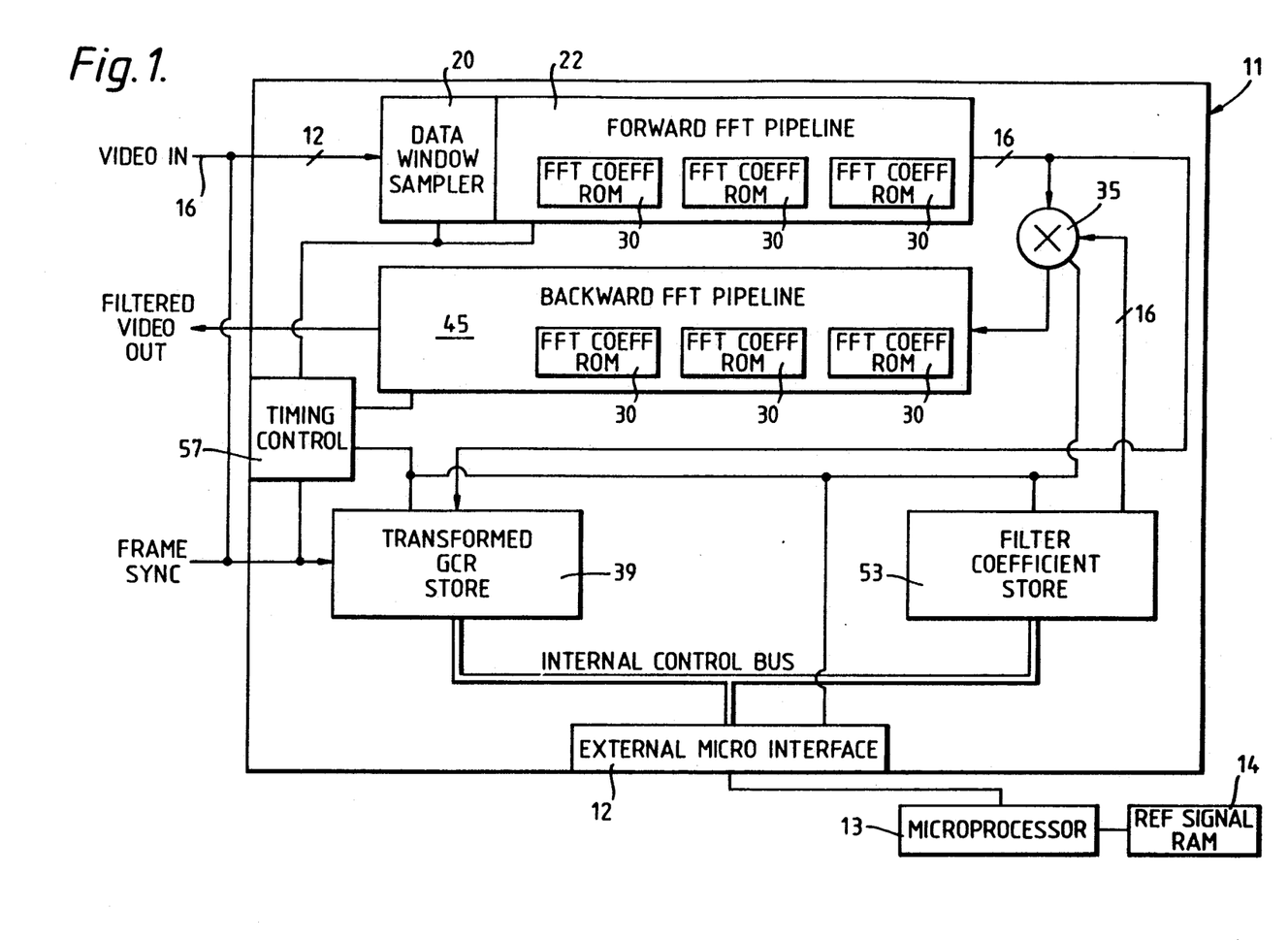
FIG. 1 is a block diagram of a ghost removal filter in accordance with the present invention.
Figure 2:
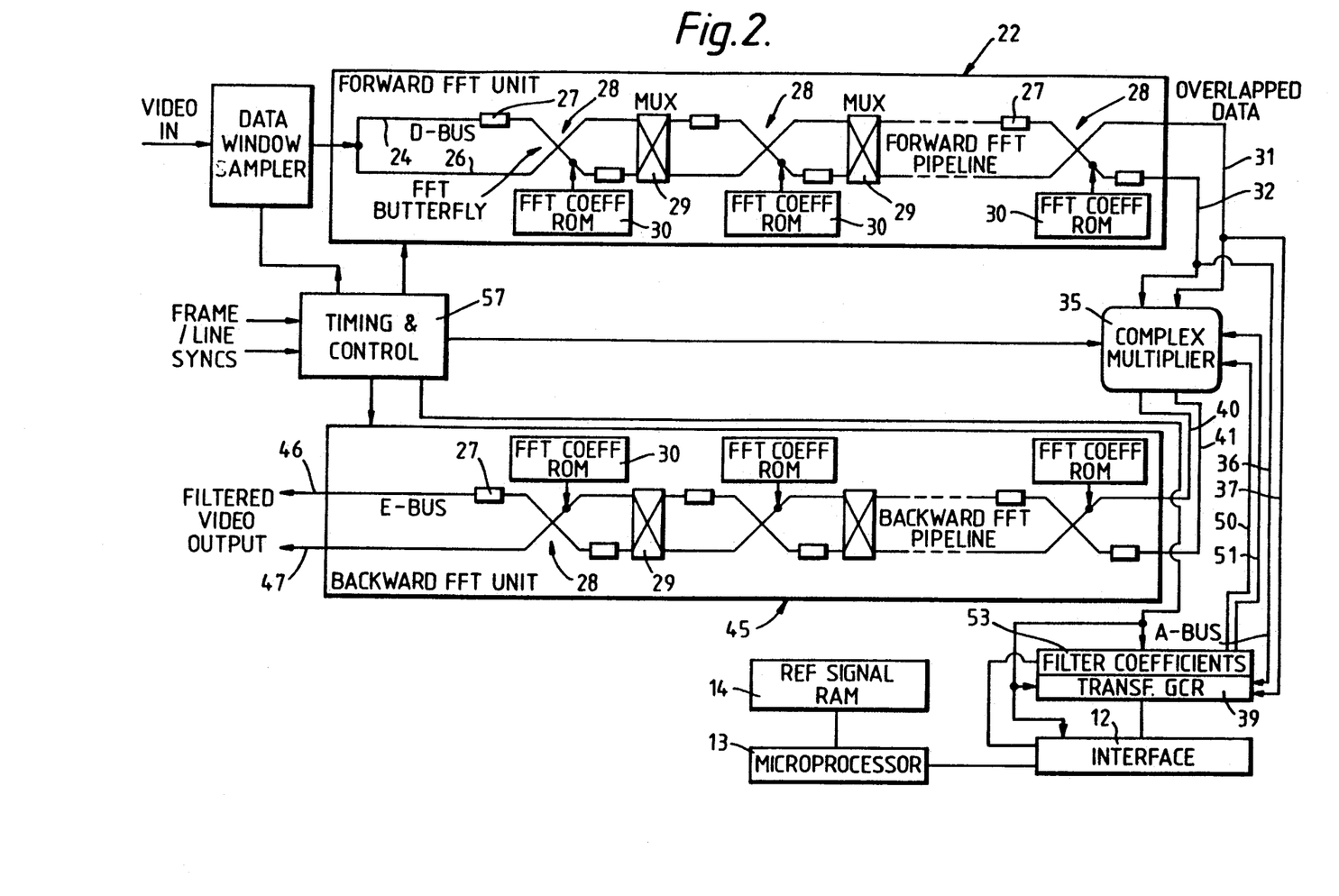
FIG. 2 shows more detail of the embodiment of FIG. 1.

In the embodiment of FIG. 1 a filter for operating in the frequency domain is formed on a semiconductor chip 11. This is connected through an interface 12 to a microprocessor 13 which is also connected to a RAM 14 storing a representation of a ghost cancellation reference signal. A video signal sequence is input at 16. As is customary, the video signal is divided into a succession of frames each having a plurality of lines and the signal incorporates frame and line synchronization signals as well as a ghost cancellation reference signal occurring in each frame at a set position after the occurrence of the frame synchronization signal. The form of reference signal stored in the RAM 14 is identical with the reference signal incorporated in the video input 16 at the time the video signal was transmitted by the transmitter. Consequently, any ghosts or echoes which are included in the video signal received at the input 16 will effect the reference signal in the same manner as the remaining video data. The video signal is supplied to a window sampling circuit 20 which divides the video sequence into a succession of data windows in the time domain, each window including a specified number of data samples. Successive data windows are supplied to a forward Fast Fourier Transform pipeline 22. More details are shown in FIG. 2, and the pipeline is constructed as already referred to in the above published reference. The pipeline comprises two parallel buses 24 and 26 connecting a series of delay devices 27 and butterflies 28. The serial connections also include a plurality of multiplexers 29. Each butterfly in this example is a radix 2 each connected to a respective ROM 30 containing the necessary transform coefficient for the radix. The output of the pipeline 22 is provided on lines 31 and 32. The signals on lines 31 and 32 represent the transformed data windows in the frequency domain and the signals on lines 31 and 32 represent 50% overlapped data windows. This 50% overlap is achieved by the first delay unit 27 in the two parallel buses 24 and 26 used in the pipeline 22. The overlapping data in the frequency domain is fed to a complex multiplier 35 or it may be supplied on buses 36 and 37 directly to a RAM 39 acting as a store for the transformed ghost cancellation reference signal. The output of the multiplier 35 is supplied on buses 40 and 41 to the input of the backward Fast Fourier Transform pipeline 45. This is constructed to form the inverse transform from the frequency domain to the time domain so that the time domain signal is output on the buses 46 and 47. The pipeline 51 comprises a plurality of radix 2 butterflies 28, delay units 27, multiplexers 29 and transform coefficient ROMs 30 similar to those described in the pipeline 22.

In this example the transformed output of the forward Fast Fourier Transform pipeline 22 on lines 31 and 32 is multiplied by filter coefficients which are supplied to the multiplier 35 on buses 50 and 51. These filter coefficients are held in the frequency domain. The filter coefficients are stored with zero padding. In this way the multiplier 35 calculates the product of the two frequency domain multiplicands, one representing a data window of the video signal and the other representing the filter coefficients indicating the ghost pattern which has been detected, together with zero values. The multiplicand representing the data window of the video signal has a vector length dependent on the number of samples in the data window. The other multiplicand has a similar vector length and comprises 50% filter coefficients and 50% zeros. The microprocessor 13 is used to detect the ghost pattern in the video signal sequence and calculate the necessary filter coefficient accordingly.

To detect the ghost pattern, the received form of the ghost cancellation reference signal at the input 16 is transformed by the forward pipeline 22 and the signal fed on buses 36 and 37 to the store 39 which holds the transformed representation of the reference signal as received through the input 16. The form of the reference signal which was transmitted by the transmitter is held in the RAM 14, and in this example the signal is stored in the frequency domain. The microprocessor 13 is able to input the reference signal from the RAM 14 and compare this with the transformed reference signal last received through the input 16 and now held in the store 39. The microprocessor accesses that store and a coefficient store 53 through the interface 12. By comparing the received form of the reference signal in the frequency domain with the stored form of the original reference signal in the RAM 14, the microprocessor 13 calculates a transfer function in the frequency domain representing the ghost pattern which has been induced between transmission and reception of the video signal. This transfer function in the frequency domain provides the necessary filter coefficients which are then supplied by the microprocessor 13 through the interface 12 to the filter coefficient store 53.

In carrying out the filtering operation to remove the ghosts, successive data windows are supplied through the pipeline 22 and multiplied by the multiplier 35 with the filter coefficients derived from the store 53. This effects convolution to remove the ghosts and the output of the multiplier on lines 40 and 41 is subject to an inverse transform to provide a filtered output on buses 46 and 47 in the time domain. The effect of the time delays in the pipeline 45 will cause blocks of output data to be abutted together so as to form a continuous stream representing the continuous sequence of video in data from which the ghosts detected have been removed.

The operation of the two pipelines 22 and 45 as well as the multiplier 35, interface 12 and stores 39 and 53 is controlled by a timing control circuit 57 arranged to receive frame and line synchronization signals from the video signal sequence. Each frame synchronization signal received will indicate to the chip, that new ghost cancellation reference signal is entering the chip and the data buses may be controlled so that each received ghost cancellation reference signal is not passed through the multiplier 35 but is supplied to the store 39 in order to update the transformed reference signal held in store. The microprocessor 13 may be programmed to update the filter coefficients after any required number of frames. The chip is driven from the line and frame synchronization signals provided in the video input at input 16.

In the example of FIGS. 1 and 2 the microprocessor 13 and RAM 14 are provided off chip. However, FIGS. 3 and 4 show two alternative embodiments each formed as a single chip implementation.

In both these additional examples similar reference numerals have been used for those parts corresponding to parts already described in FIGS. 1 and 2.

Figure 3:
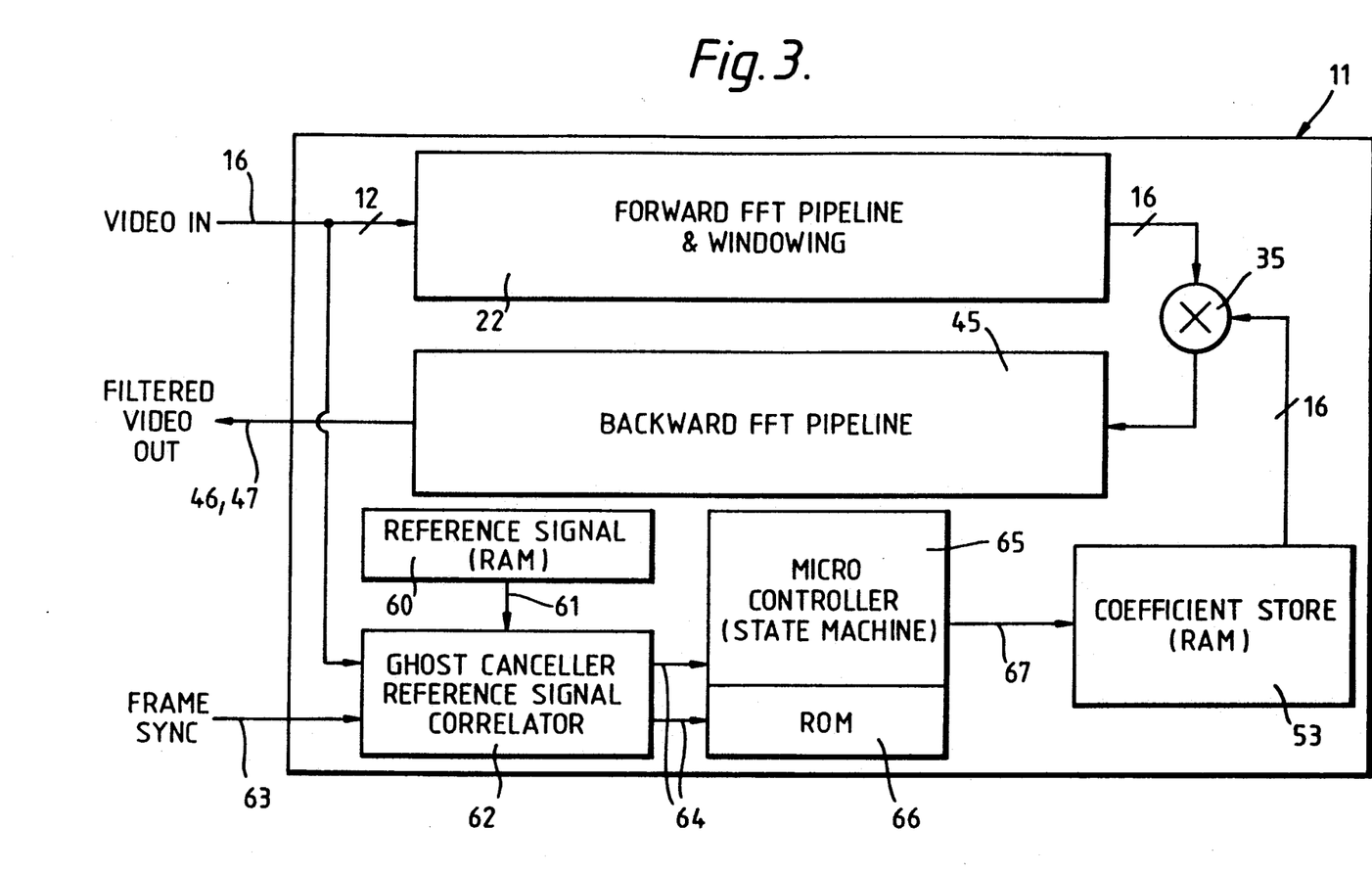
FIG. 3 is a block diagram of an alternative filter in accordance with the invention and formed on a single chip.

In the embodiment of FIG. 3, detection of the ghost pattern in the video signal is carried out by correlation of a stored ghost cancellation reference signal with the received ghost cancellation reference signal in the time domain. In place of the RAM 14 of FIG. 1, this example has an on chip RAM 60 holding a time domain representation of the ghost cancellation reference signal. This is supplied on line 61 to a correlator 62 in the form of an adaptive filter which may be for example as described in our U.S. Pat. No. 4,920,508. The correlator 62 also receives from the video input 16 the form of ghost cancellation reference signal which is included in the video signal sequence received by the chip and under the control of the frame synchronization signal on line 63 the correlator compares the two signals in the time domain so as to detect the ghost pattern. The output is supplied on line 64 to a microprocessor controlled by a program stored in ROM 66. The microprocessor 65 calculates the necessary filter coefficients and converts them to the frequency domain before supplying on line 67 to the coefficient store 53. During the filtering operation, the RAM 53 supplies filter coefficients to the multiplier 35 for multiplication with the transformed data window signals as previously described with reference to FIGS. 1 and 2. The output of the multiplier 35 is similarly inversely transformed by pipeline 45 to provide a filtered output 46 and 47 in the time domain as previously described. In order to calculate the frequency domain form of the filter coefficients the microcontroller 65 may be connected to the forward Fast Fourier Transform pipeline 22 so as to input the filter coefficient data in the time domain at the input of the pipeline 22 and supply to the RAM 53 the transformed output of the pipeline 22.

Figure 4:
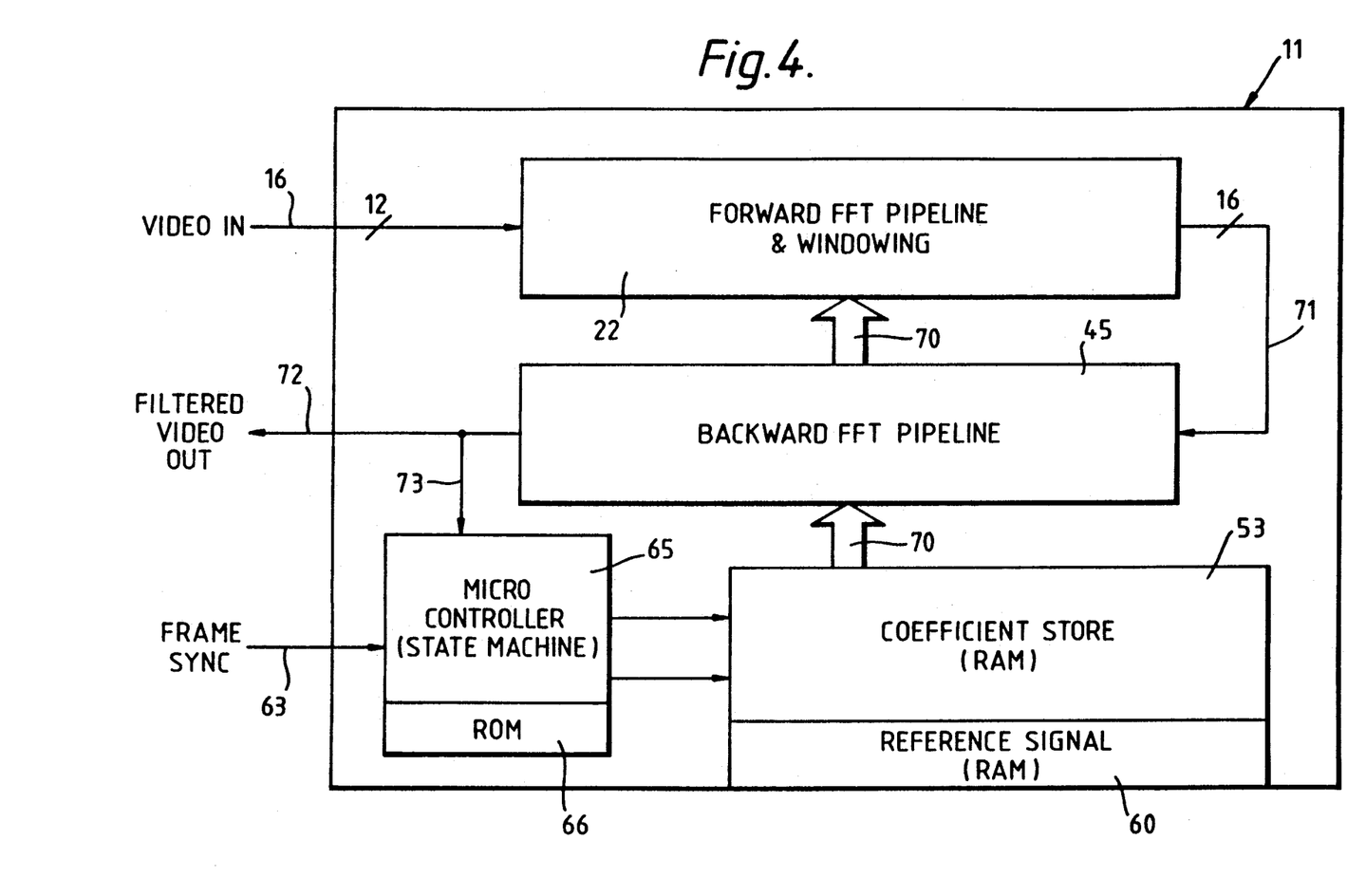
FIG. 4 is a further single chip filter in accordance with the invention.

In the embodiment shown in FIG. 4, the main difference is in the way in which the product is formed in the frequency domain of the transform of the video signal data windows and the filter coefficients. The filter coefficients are again held in the RAM 53, but instead of forming the product by use of a multiplier connected to the output of the pipeline 22, the multiplication is effected within the pipeline 22 by altering the coefficients supplied to the butterflies 28 in the forward pipeline 22. The store 53 is connected by bus 70 to the FFT pipelines and is arranged to supply to the butterflies 28 in the forward pipeline 22 coefficient values in addition to those supplied by each ROM 30. In this way, each butterfly in the forward pipeline responds to coefficient values representing the transform coefficient, and also the filter coefficients from the store 53. This is advantageous in enabling single chip implementation in reducing the number of multiplication circuits necessary. The multiplication is effected automatically in the forward pipeline 22 in forming the Forward Fourier Transform. The output 71 of the forward pipeline 22 is connected directly to form an input to the backward pipeline 45. The output 72 from the pipeline 45 is a filtered time domain output from which the ghosts have been removed. In order to calculate the filter coefficients for holding in the store 53, a frequency domain representation of the ghost cancellation reference signal is held in RAM 60. The microprocessor 65 is again controlled by a program held in ROM 66. In this example, the backward pipeline 45 can be disabled when the ghost pattern is being detected. The ghost cancellation reference signal in the video signal at input 16 can be transformed by the forward pipeline 22 and passed to the input 73 to the microprocessor 65 without forming the inverse transform. This frequency domain representation of the received reference signal is then compared with that stored in the RAM 60 and the appropriate filter coefficients supplied from the microprocessor 65 to the RAM 53.

In both the examples of FIGS. 3 and 4, the filter coefficients are stored in the store 53 with zero padding as previously described with reference to FIGS. 1 and 2.

It will be appreciated that in each of the above examples the filter coefficient store 53 has sufficient capacity to store existing filter coefficients for use in continuously filtering the video input signals while the microprocessor calculates new coefficients and supplies them to the RAM 53 ready for switching in at a required time so as to update the coefficients for new ghosts or take account of ghosts that have disappeared.

The invention is not restricted to the details of the foregoing examples.

Although the above examples describe a single filter, it may be desirable in some cases to use two or more filters in series. The main filter as already described may be preceded by a first filter of similar construction and operation but arranged to carry out filtering of close ghosts with a short delay as well as compensating for dispersion due to variation in signal reception across the frequency range of the video signal. A first filter equivalent to a 64 tap filter may first remove the close ghosts and compensate for dispersion before supplying the signal to the main filter to handle longer delayed ghosts. Both filters may operate in the frequency domain using a single FFT operation and be formed on a single chip.

I claim:

1. A method of filtering ghost signals from a video signal sequence which includes a ghost cancellation reference signal, which method comprises storing a representation of said reference signal, receiving said video signal at an input, effecting a comparison of said reference signal in the video signal sequence received at said input with said stored representation to detect ghost signals and forming, in a frequency domain, filter coefficients dependent on ghost signals detected by said comparison, forming a fourier transform of said video signal received at the input to transform the signal from the time domain to the frequency domain and effecting multiplication in the frequency domain of the transform of the video signal with said filter coefficients to form a product, and effecting an inverse fourier transform of said product so as to provide an output in the time domain of the video signal from which detected ghost signals have been removed.

2. A method according to claim 1 in which the said video signal sequence is divided into a succession of data windows each including a selected number of data samples and fourier transforms are formed on data in each of a succession of data windows, a respective said product being formed for each data window, and said inverse fourier transform is effected for each successive product to provide a succession of outputs which are serially joined to form an output sequence of video signals corresponding to a plurality of said data windows.

3. A method according to claim 2 in which each product is formed by multiplying together data in one window as a first multiplicand with a second multiplicand including the said filter coefficients, both multiplicands having a vector length equal to the number of data samples in one window.

4. A method according to claim 2 in which said product is formed from first and second multiplicands and in which successive first multiplicands each comprise data derived from respective overlapping data windows in the video signal sequence and said second multiplicands each comprise filter coefficients to which zero values have been added providing an equal vector length for each multiplicand.

5. A method according to claim 4 in which each data window has a substantially 50% overlap with data in an adjacent window.

6. A method according to claim 5 in which each second multiplicand comprises 50% filter coefficients and 50% zero values.

7. A method according to claim 1 in which the forward fourier transform of said video signal is formed in a forward pipeline comprising a plurality of radix-n butterflies connected in series, and transform coefficients are selected and supplied to each of said butterflies.

8. A method according to claim 7 in which the inverse fourier transform of each product is formed by a backward fourier transform pipeline comprising a plurality of radix-n butterflies connected in series, and transform coefficients are selected and supplied to each of said butterflies.

9. A method according to claim 7 in which the said product is formed by multiplying an output from the forward fourier transform pipeline with a signal representing the filter coefficients.

10. A method according to claim 7 in which the said product is formed by supplying to the radix-n butterflies in the forward fourier transform pipeline coefficient values representing the filter coefficients as well as transform coefficients.

11. A method according to claim 1 in which the comparison of the reference signal in the video signal sequence with the stored reference signal is effected by correlation in the time domain to calculate coefficients which are transformed to the frequency domain to form filter coefficients for use in forming said product.

12. A method according to claim 1 in which said stored reference signal is stored in the frequency domain and the comparison of the reference signal in the video signal sequence with the stored reference signal is effected by forming a fourier transform of the reference signal in the video signal sequence received at the input to provide a representation of the reference signal in the frequency domain, comparing said representation with the stored reference signal and thereby providing the filter coefficients in the frequency domain.

13. A method according to claim 1 in which a plurality of products are each formed by multiplying together successive pairs of first and second multiplicands in the frequency domain, the first multiplicand of each pair including data from a data window in said video signal sequence and the second multiplicand of each pair including data representing said filter coefficients, data in one of said multiplicands in one pair partially overlapping the same data in a subsequent pair of multiplicands and the other of said multiplicands in said one pair includes a plurality of zero values in addition to data, the plurality of zero values corresponding to the said overlapping of data to permit joining of successive products to provide a continuous output signal corresponding to said video signal sequence.

14. A method according to claim 13 in which the said first and second multiplicands are both of the same vector length.

15. A method according to claim 13 or claim 14 in which the said first multiplicand of each pair has overlapping data from a data window and the second multiplicand of each pair has zero values added to the filter coefficients.

16. A method according to claim 1 in which the video signal sequence is divided into frames each comprising a plurality of lines and in which the comparison of the reference signal in the video signal sequence with the stored reference signal is repeated after a selected number of frames so as to provide new filter coefficients to take account of any changes in ghost signal occurrence.

17. A method according to claim 1 including effecting two filtering operations in series, the first filtering operation removing ghost signals having a relatively short time delay and the second filtering operation removing ghost signals with a longer time delay.

18. Apparatus for filtering ghost signals from a video signal sequence which includes a ghost cancellation reference signal which apparatus comprises storage circuitry for storing a representation of the reference signal, input circuitry for inputting video signals from the video signal sequence, comparison circuitry for comparing the stored representation of the reference signal with the reference signal received in the video signal sequence at said input circuitry thereby to detect ghosts, filter coefficient generating circuitry connected to said comparison circuitry to generate a frequency domain representation of filter coefficients dependent on ghost signals detected, a forward fourier transform pipeline connected to said input circuitry to form a frequency domain representation of data in the video signal sequence received by said input circuitry, product forming circuitry for forming in the frequency domain a product of the filter coefficients with the frequency domain representation of the data in the video signal sequence, and an inverse fourier transform pipeline connected to said product forming circuitry for receiving said product and transforming it to provide an output in the time domain representing said video signal sequence from which detected ghost signals have been removed.

19. Apparatus according to claim 18 in which the product forming circuitry comprises a multiplier connected between an output of the forward fourier transform pipeline and an input of the inverse fourier transform pipeline.

20. Apparatus according to claim 18 in which each fourier transform pipeline comprises a series of radix-n butterflies connected in series with transform coefficient stores connected to each butterfly.

21. Apparatus according to claim 18 in which each fourier transform pipeline comprises a series of radix-n butterflies connected in series with transform coefficients stores connected to each butterfly and the product forming circuitry is connected to the forward fourier transform pipeline to supply to said radix-n butterflies coefficient values representing the filter coefficients in addition to the transform coefficients.

* * * * *